(12) United States Patent
Kappes et al.

(10) Patent No.: US 10,179,577 B2
(45) Date of Patent: Jan. 15, 2019

(54) METHOD FOR CONTROLLING OPERATION OF A BRAKING SYSTEM INDEPENDENT OF THE STATE OF AN ELECTRONIC STABILITY CONTROL SYSTEM

(71) Applicant: Ford Global Technologies, LLC, Dearborn, MI (US)

(72) Inventors: Stefan Kappes, Pulheim (DE); Florian Schweter, Essen (DE); Markus Jung, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 592 days.

(21) Appl. No.: 14/197,323

(22) Filed: Mar. 5, 2014

(65) Prior Publication Data
US 2014/0257660 A1    Sep. 11, 2014

(30) Foreign Application Priority Data

Mar. 6, 2013    (DE) .................... 10 2013 203 775

(51) Int. Cl.
*B60T 8/1755* (2006.01)
*B60T 7/22* (2006.01)
*B60T 7/12* (2006.01)

(52) U.S. Cl.
CPC ............. *B60T 8/1755* (2013.01); *B60T 7/12* (2013.01); *B60T 7/22* (2013.01); *B60T 2201/024* (2013.01); *B60T 2270/402* (2013.01)

(58) Field of Classification Search
CPC .. B60T 7/12; B60T 2201/02; B60T 2201/024; B60T 8/1755
See application file for complete search history.

(56) References Cited

U.S. PATENT DOCUMENTS

| 2004/0000081 | A1  | 1/2004 | Paschall |
| 2006/0015239 | A1  | 1/2006 | Higuchi |
| 2007/0185639 | A1* | 8/2007 | Osborn et al. .................. 701/71 |
| 2007/0192003 | A1  | 8/2007 | Hashiba |
| 2009/0112435 | A1  | 4/2009 | Meyers et al. |
| 2009/0192687 | A1  | 7/2009 | Zagorski |
| 2011/0035129 | A1  | 2/2011 | Yasui |

FOREIGN PATENT DOCUMENTS

| DE | 102004031305 A1 | 1/2006 |
| DE | 102008038540 A1 | 2/2010 |
| DE | 102009058147 A1 | 6/2011 |
| DE | 102011005395 A1 | 12/2011 |
| DE | 102011121496 A1 | 6/2013 |

* cited by examiner

*Primary Examiner* — Lail A Kleinman
(74) *Attorney, Agent, or Firm* — Raymond L. Coppiellie; Burgess Law Office, PLLC

(57) ABSTRACT

A method for controlling an emergency braking system of a motor vehicle having a stability control system when the stability control system is deactivated or placed in a reduced mode. The method includes the step of determining whether the stability control system is in a deactivated or reduced mode and keeping the automatic emergency braking system active even if the stability control system is deactivated or in a reduced mode. The system includes temporarily activating the stability control system if a hazardous situation exists requiring generation of an emergency braking command.

12 Claims, 2 Drawing Sheets

METHOD FOR CONTROLLING OPERATION OF A BRAKING SYSTEM INDEPENDENT OF THE STATE OF AN ELECTRONIC STABILITY CONTROL SYSTEM

CROSS-REFERENCE TO RELATED APPLICATIONS

Not Applicable

BACKGROUND OF THE INVENTION

1. Field of the Invention

The present application relates to a method for controlling an emergency braking system of a motor vehicle having an electronic stability control system.

2. Description of Related Art

Motor vehicles can be equipped with both emergency braking systems for reducing the speed of the motor vehicle and electronic stability control systems for controlling vehicle dynamics.

Emergency braking systems, including automatic or autonomous emergency braking systems, apply a specific braking force to reduce the speed of the vehicle upon determining a risk of a possible collision. Typically, sensor signals continuously monitor the differential speed between the respective vehicle and the target vehicle or the pedestrian in relation to the spacing in order to, if appropriate, generate an automatic speed reduction if not initiated by the driver. Initiating an automatic speed reduction includes a possibility that the vehicle will enter an irregular vehicle state; i.e., over or under steering. Normally the electronic stability control system is available to compensate for any irregular vehicle state.

Where the driver has deactivated the electronic stability control or switched it to reduced mode, deactivation or switching to a reduced mode of the emergency braking system occurs to avoid a possible unstable vehicle state. Until activation of the electronic stability control, the emergency braking system remains unavailable.

SUMMARY OF THE INVENTION

One embodiment of the present invention includes a method for controlling an emergency braking system of a motor vehicle. In one example the method for controlling an emergency braking system includes the steps of determining whether a stability control system is deactivated or in a reduced mode, keeping the emergency braking system active even if the stability control system is deactivated or in a reduced mode, determining whether a hazardous situation exists, generating an emergency braking command and initiating emergency braking, temporarily activating the stability control system if the emergency braking command is generated, and resetting the stability control system to a deactivated or reduced mode upon determination that the hazardous situation has been eliminated, wherein the emergency braking system remains in its active mode.

In the present example, the emergency braking system remains active even though the emergency stability control system is initially deactivated or active in the reduced mode. The emergency braking system remains active without the risk of an irregular vehicle state since the electronic stability control automatically switches to an active state, at least temporarily, for the duration of the emergency braking system intervention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
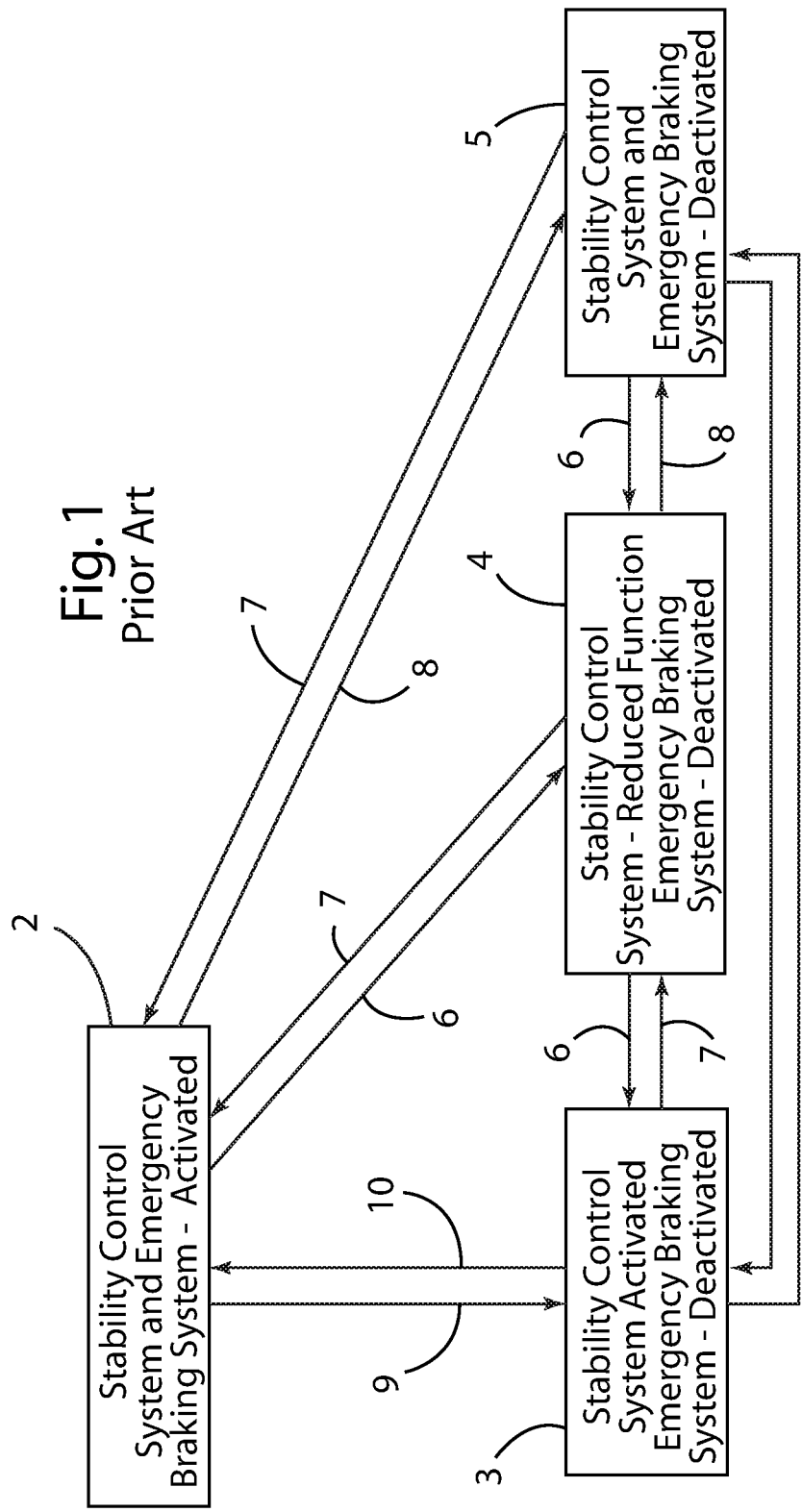
FIG. 1 is a schematic view of a system diagram for controlling an emergency braking system of a motor vehicle having a stability control system according to prior art.

FIG. 1 shows a prior art method for controlling an emergency braking system of a motor vehicle having a stability control system. The prior art system includes 4 possible states. In the first state, block 2, both the stability control system and the emergency braking system are activated. In the second state, block 3, the stability control system is activated and the emergency braking system is deactivated. In the third state, block 4, the stability control has reduced function and the emergency braking system is deactivated. In the fourth state, block 5, both the stability control system and the emergency braking system are deactivated.

Driver commands, schematically illustrated as arrows 6, 7, 8 and 9, select the state. The driver can issue a command 6 to place the stability control system in the reduced mode or third state, block 4. The driver command 6 enables switching from the first state, block 2, wherein both the stability control system and the emergency braking system are activated to the third state, block 4, wherein the stability control system is reduced in function and the emergency braking system is completely deactivated. The driver command 6 also enables switching from the fourth state, block 5, wherein both the stability control system and the emergency braking system are deactivated to the third state, block 4, wherein the stability control system is reduced in function and the emergency braking system is completely deactivated. Further, driver command 6 enables switching from the second state, block 3, wherein the stability control system is activated and the emergency braking system is deactivated to the third state, block 4, wherein the stability control system is reduced in function and the emergency braking system is completely deactivated The driver can issue a command 7 to place the electronic stability control in the completely active mode. The driver command 7 switches the system from the third state, block 4, wherein the stability control system is reduced in function and the emergency braking system is completely deactivated to the first state, block 2, wherein the stability control system and emergency braking system are activated. Further, command 7 switches the system from the fourth state, block 5, wherein both the stability control system and the emergency braking system are deactivated to the second state, block 3, wherein the stability control system is activated and the emergency braking system is deactivated. Command 7 also switches the system from the third state, block 4, wherein the stability control system is reduced and the emergency braking system is deactivated to the second state, block 3, wherein the stability control system is activated and the emergency braking system is deactivated. Command 7 also switches the system from the fourth state, block 5, wherein both the stability control system and the emergency braking system are deactivated to the first state, block 2, wherein the stability control system and emergency braking system are activated.

The driver can issue a command 8 to place the electronic stability control in a completely deactivated state. The driver command 8 switches the system from the first state, block 2, wherein the stability control system and the emergency braking system are activated to the fourth state, block 5, wherein both the stability control system and the emergency braking system are deactivated. Command 8 switches the system from the second state, block 3, wherein the stability control system is activated and the emergency braking system is deactivated to the fourth state block 5, wherein both the stability control system and the emergency braking system are deactivated. Command 8 also operates to switch the system from the third state, block 4, wherein the stability control system is reduced in function and the emergency braking system is completely deactivated to the fourth state, block 5, wherein both the stability control system and the emergency braking system are deactivated.

The driver issues a command 9 to place the emergency braking system in the deactivated state. The driver command 9 can only switch the system from the first state, block 2, wherein both the stability control system and emergency braking system are activated to the second state, block 3, wherein the stability control system is activated and the emergency braking system is deactivated.

The driver can issue a command 10 to place the emergency braking system in the completely active state. The driver command 10 can only switch the system from the second state, block 3, wherein the stability control system is activated and the emergency braking system is deactivated to the first state, block 2, wherein both the stability control system and emergency braking system are activated.

As is apparent in FIG. 1 deactivating the electronic stability control or placing it in a reduced mode always deactivates the emergency braking system to avoid unstable vehicle states.

Figure 2:
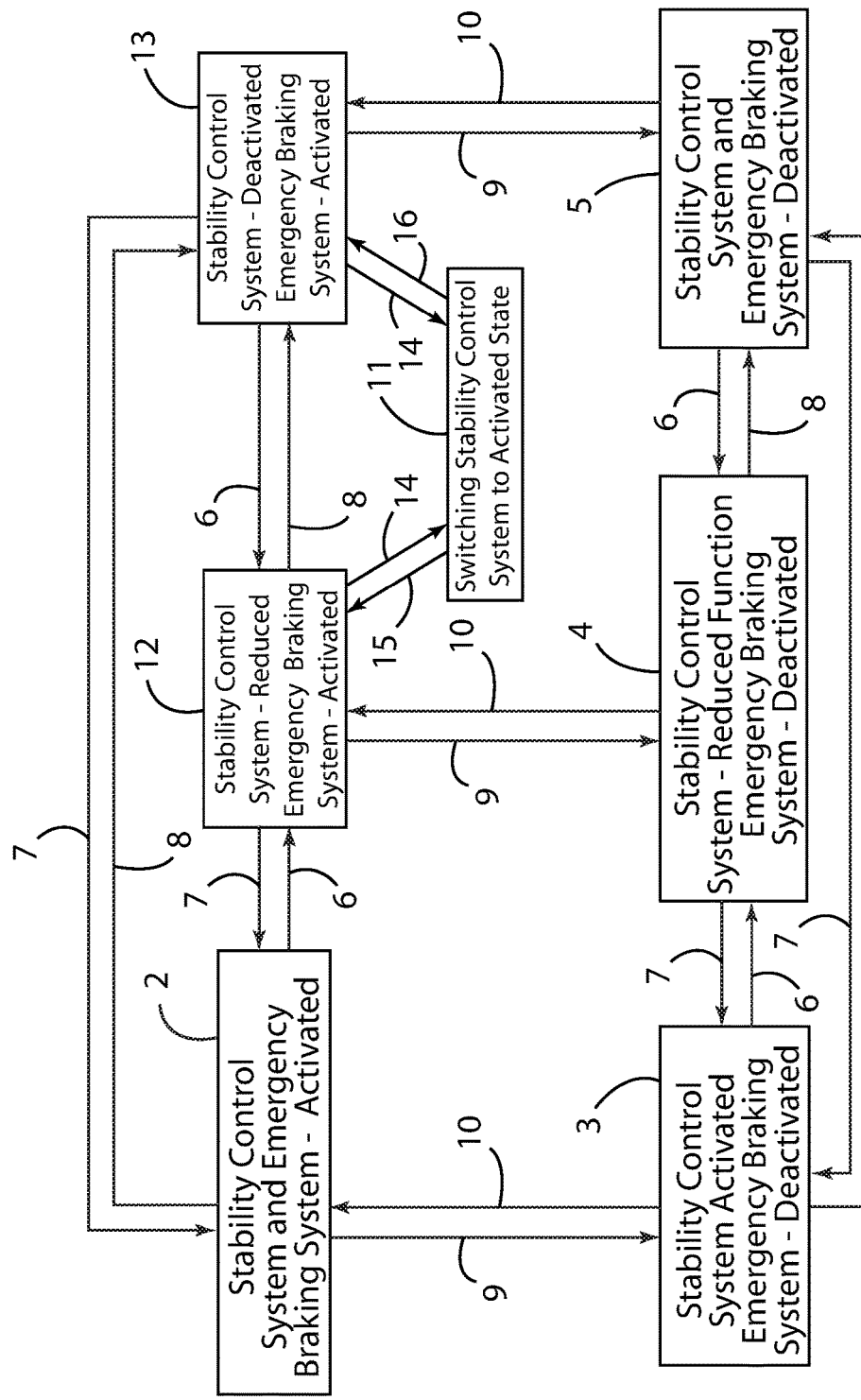
FIG. 2 is a schematic view of a system diagram for controlling an emergency braking system of a motor vehicle having a stability control system according to the invention.

FIG. 2 shows an example of the present invention including a method wherein the emergency braking system remains active reducing the risk of vehicle instability even though the electronic stability control is initially deactivated or active in the reduced mode. The method includes automatically switching the electronic stability control to an active state at least temporarily, at least for the duration of the emergency braking system intervention, block 11. In the disclosed example, the system includes a fifth state, block 12, wherein that the electronic stability control is reduced and the emergency braking system is completely active. They system further includes a sixth state, block 13, wherein the electronic stability control is completely deactivated and the emergency braking system is completely active.

The commands corresponding with arrows 6, 7, 8, 9, 10 in FIG. 2 function in the same manner as set forth in and corresponding to FIG. 1.

Unlike the prior art illustrated in FIG. 1, FIG. 2 illustrates a system including an additional fifth state, block 12, wherein even though the electronic stability control is reduced the emergency braking system remains active; and a sixth state, block 13, wherein even though the electronic stability control is deactivated the emergency braking system remains active.

In the present example, the system generates an automatic command or signal 14 that places the electronic stability control in either the fifth state, block 12, reduced in function or the sixth state, block 13, completely deactivated in an active state. Generating an automatic command or signal 14 makes it possible to leave the emergency braking system in the active state even though the electronic stability control is deactivated or placed in a reduced state. For example, when a hazardous situation requires activation of the emergency braking system to generate emergency braking, a reduction in speed, electronic stability control occurs even though the vehicle driver or operator deactivates or places the electronic stability control in a reduced state. In such a situation, the system operates to, at least temporarily, switch the electronic stability control to a completely active state.

Upon overcoming the hazardous situation the electronic stability control is automatically reset, preferably with a delay, into the respective previous fifth or sixth state, block 12, block 13, using command signals 15, 16.

The method, according to FIG. 2 determines determining whether the electronic stability control is completely active; including making the determination based upon detection of a hazardous situation requiring emergency braking. Upon receiving confirmation that the electronic stability control is in the deactivated, fifth state, block 12, or switched to a reduced, sixth state, block 13, the system generates a signal for temporarily activating the electronic stability control. Upon overcoming the hazardous occurrence the original state is restored, see block 12, block 13.

As illustrated in FIG. 2, the driver commands 6, 8 illustrate switching between the respective fifth state, block 12, and sixth state, block 13. Driver commands 6, 7 illustrate switching between the respective first state, block 2, and fifth state, block 12. Driver commands 7, 8 illustrate switching between the respective first state, block 2, and sixth state, block 13. In addition, driver commands 9, 10 illustrate switching between the respective fifth state, block 12 and third state, block 4, and sixth state, block 13, and fourth state, block 5. Accordingly the present invention contemplates providing sufficient driver command commands enabling selection of different system states.

In a further example, the method according to the invention can also be carried out for an emergency braking operation initiated by the driver. If the electronic stability control is deactivated or in a reduced state there is the risk of an unstable vehicle. In such as case, activation of the emergency braking operation by the driver temporarily switches the electronic stability control to an active state.

In the event of deactivation or placing the electronic stability control in the reduced mode unstable vehicle states are avoided within the scope of the physical and technical system possibilities of the electronic stability control despite activation of the emergency braking system. As set forth, the electronic stability control switches briefly, in targeted fashion, from the deactivated or reduced state into a completely active state resulting in the electronic stability control fulfilling its stability function when the emergency braking system is active and functioning for initiating emergency braking.

An emergency braking signal or an emergency braking operation is, within the sense of the invention, any reduction in speed of the vehicle not perceived by the driver. Reduction in speed can also have the effect that the sensors, during the reduction in speed, negate the originally determined hazardous situation and ending emergency braking. An emergency braking operation can also lead to a forced stationary state of the vehicle, but the automatic braking intervention should not override the driver's request such that new hazardous situations are generated by incorrect reactions. Therefore, full braking at a high vehicle speed is ruled out, wherein an emergency braking situation of a full braking type is possible at a low vehicle speed up to a stationary state, for example in town traffic.

It is beneficial that the electronic stability control is only temporarily switched into the completely active mode so that the electronic stability control is active only for the braking interventions initiated by the emergency braking system.

If it is determined that the emergency braking system intervention has successfully eliminated the hazardous situation than, the electronic stability control is switched into the previous mode. Switching into the deactivated or reduced mode can take place immediately, but preferably after a delay. The delay eliminates possible switching time losses, i.e. system-imminent delays, in the case of a hazardous situation that follows within a short time.

If the electronic stability control is switched off or deactivated, switched into a reduced mode by the driver, then the emergency braking system is active and capable of bringing about a reduction in speed with the vehicle braking system. With an active emergency braking system speed reduction command, one given by activation of the brake, the electronic stability control is automatically switched to a temporarily, i.e. briefly, complete operation mode, or activated, to ensure stable vehicle dynamics in the host vehicle. If the emergency braking system speed reduction command ends and the vehicle is in a stable vehicle dynamics mode, the electronic stability control is automatically switched back (immediately or with a certain delay) into the mode in which it was before the emergency braking system speed reduction command was initiated. The emergency braking system therefore supports the driver even if the electronic stability control was previously either partially or completely deactivated. It is therefore favorable that switching back of the electronic stability control mode does not take place until the vehicle is stable.

The solution according to the invention can be used in virtually all types of motor vehicle both in terms of the method and in terms of the device, wherein the procedure can be stored in a control device, for example in the central control unit, in which the necessary signals are conveniently interrogated and correspondingly processed.

What is claimed is:

1. A method for controlling an emergency braking system of a motor vehicle having a stability control system comprising the steps of:
   determining whether the stability control system is in a deactivated or in a reduced state;
   maintaining the emergency braking system active even if the stability control system is deactivated or in a reduced state;
   determining a hazardous situation;
   generating an emergency braking command and initiating emergency braking; and
   temporarily activating the stability control system if said emergency braking command is generated.

2. The method as set forth in claim 1 wherein the stability control system is switched back to said deactivated or reduced state if it is detected that the hazardous situation has been eliminated.

3. The method as set forth in claim 1 wherein the stability control system is switched back immediately to said deactivated or reduced state if it is detected that the hazardous situation has been eliminated.

4. The method as set forth in claim 2 wherein the stability control system is switched back immediately to the deactivated or reduced state if it is detected that the hazardous situation has been eliminated.

5. The method as set forth in claim 1 wherein the stability control system is switched back into the deactivated or reduced state with a delay if it is detected that the hazardous situation has been eliminated.

6. The method as set forth in claim 2 wherein the stability control system is switched back into said deactivated or reduced state with a delay if it is detected that the hazardous situation has been eliminated.

7. A method for controlling an emergency braking system of a motor vehicle having a stability control system, comprising:
   determining whether the stability control system is deactivated or in a reduced state;
   maintaining the emergency braking system active even if the stability control system is deactivated or in a reduced mode;
   determining a hazardous situation;
   generating an emergency braking command and initiating emergency braking;
   activating the stability control system if the emergency braking command is generated; and
   monitoring driving stability and switching the stability control system back to a deactivated or in a reduced state upon establishing driving stability.

8. The method as set forth in claim 7 wherein the stability control system is switched back immediately to said deactivated or reduced state if it is detected that the hazardous situation has been eliminated.

9. The method as set forth in claim 7 wherein the stability control system is switched back into said deactivated or reduced state with a delay if it is detected that the hazardous situation has been eliminated.

10. A method for controlling an emergency braking system of a motor vehicle having a stability control system, comprising:
    determining whether the stability control system is deactivated or in a reduced state;
    maintaining the emergency braking system active even if the stability control system is deactivated or in a reduced state;
    determining the existence of a hazardous situation;
    generating an emergency braking command and initiating emergency braking;
    temporarily activating the stability control system if the emergency braking command is generated;
    switching the stability control system back to the respective deactivated or reduced mode if it is detected that the hazardous situation has been eliminated;
    maintaining the emergency braking system and active state; and
    switching back the stability control system upon receiving confirmation of driving stability.

11. The method as set forth in claim 10 wherein the stability control system switches back immediately to said deactivated or reduced state upon detection that the hazardous situation has been eliminated.

12. The method as set forth in claim 10 wherein the stability control system switches back into the deactivated or reduced state with a delay upon detection that the hazardous situation has been eliminated.

* * * * *